E. E. HUFFMAN.

DEPTH INDICATING DEVICE.

APPLICATION FILED MAR. 1, 1919.

Reissued Sept. 23, 1919.

14,728.

INVENTOR

E. E. Huffman

UNITED STATES PATENT OFFICE.

EDWIN E. HUFFMAN, OF ST. LOUIS, MISSOURI.

DEPTH-INDICATING DEVICE.

14,728. Specification of Reissued Letters Patent. Reissued Sept. 23, 1919.

Original No. 1,246,270, dated November 13, 1917, Serial No. 125,446, filed October 13, 1916. Application for reissue filed March 1, 1919. Serial No. 280,192.

*To all whom it may concern:*

Be it known that I, EDWIN E. HUFFMAN, a citizen of the United States of America, residing at the city of St. Louis, State of Missouri, United States of America, have invented a certain new and useful Depth-Indicating Device, of which the following is such a full, clear, and exact description as will enable any one skilled in the art to which it appertains to make and use the same, reference being had to the accompanying drawings, forming part of this specification.

My invention relates to a device for indicating at a point either adjacent to or remote from a liquid container the depth or quantity of liquid contained therein.

One of the principal objects of the invention is to provide a suitable gasolene gage to be placed upon the dash or instrument board of an automobile to indicate the depth of gasolene in the gasolene tank, regardless of the position on the machine in which the gasolene tank is located. A further object is to provide a relatively simple and inexpensive device of the character and for the purpose specified, which will respond satisfactorily to very slight pressures and will be compensated for the effects of temperature.

Generally speaking my device comprises an indicating instrument or "gage" and a tube extending therefrom and having an open end located near or at the bottom of the gasolene tank or other liquid container. The gage comprises a pressure receiving chamber, which has a flexible portion with which is associated a suitable motion multiplying and indicating mechanism. The pressure in the tube and in the pressure chamber is produced by the weight of the liquid in the tank, tending to force liquid into the tube against the confined air therein. This pressure varies proportionately to the depth of the liquid.

Figure 1:
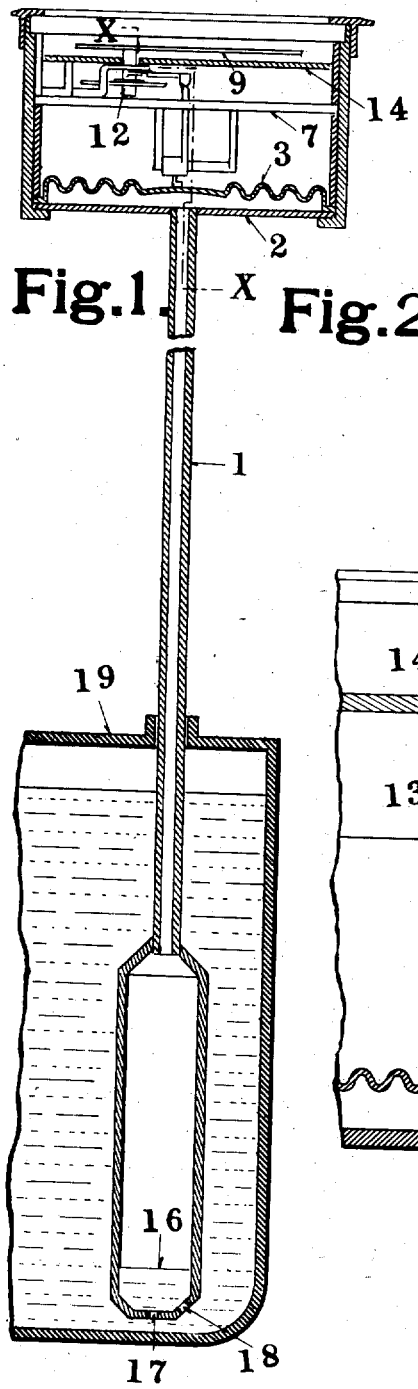
Figure 2:
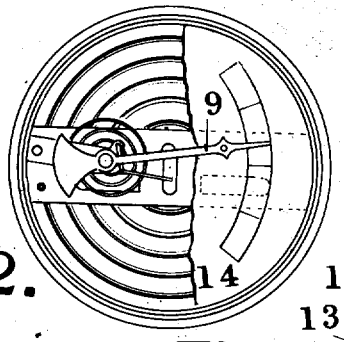
Figure 4:
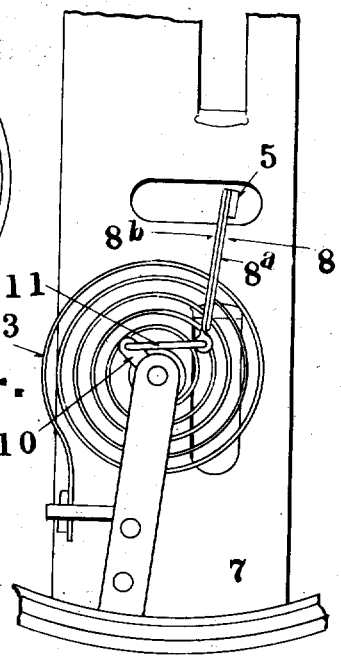
Figure 3:
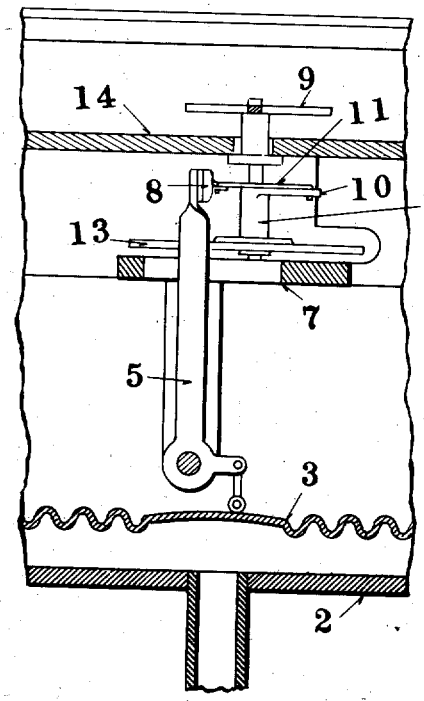
Figure 5:
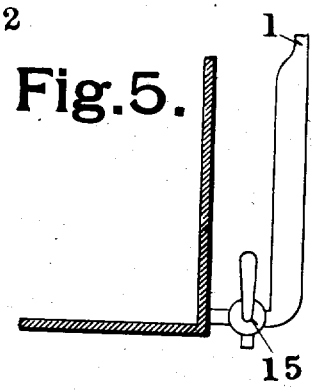
Figure 6:
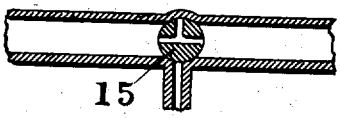

In the accompanying drawings, which illustrate one embodiment of my invention, Figure 1 is a view partly in elevation and partly in cross-section of the entire device; Fig. 2 is a top plan view of the instrument with the glass cover removed and a portion of the indicating dial broken away; Fig. 3 is a cross-sectional view taken along the lines $x\ x'$ of Fig. 1; Fig. 4 is an enlarged plan view of a portion of the instrument shown in Fig. 2. Figs. 5 and 6 illustrate a modification in method of connecting the tube to the tank.

Since the gasolene tanks in use on automobiles rarely exceed twelve inches in depth and many have a depth of only eight or nine inches, and since gasolene is lighter than water, the pressure on the air in the tube 1, due to the difference of level between the gasolene in the tank and that in the tube after the same has risen as high therein as the compressibility of confined air permits, is comparatively slight even when the tank is full. It results, therefore, that the resilient element which responds to variations in this pressure must be very sensitive and its motions, which are necessarily slight, must correspond to pressure changes, or in other words, some portion of the element must occupy the same position each time a given pressure recurs. In order to meet these requirements, I employ a pressure receiving chamber, which comprises a rigid member or plate 2 and a diaphragm 3 having its edges soldered or otherwise attached to the plate 2 to form therewith an air-tight chamber, and in order that this diaphragm, which is preferably of German silver, may bend under the influence of the applied pressure, and also in order that the greatest motion of the diaphragm may be caused to always take place at a given point and to a constant extent for given pressures, the diaphragm is provided with circular, concentric corrugations, as shown in Figs. 1 and 2. The effect of these corrugations is to cause the greatest motion of the diaphragm to be at its center and to prevent any distortions at other points, and, since all of the pressure chamber is rigid except the diaphragm, variations in pressure are effective on the diaphragm only.

A link 4 connects the center of the diaphragm with the short arm of the bell crank lever 5, which lever is pivoted on the shaft 6 carried by the supporting frame 7. At the end of the long arm of the lever 5 is rigidly attached a compensating element 8, which is composed of two strips of metal having different coefficients of expansion and welded or otherwise fastened together. One of these strips may, for example, be of brass ($8^a$) and the other of steel ($8^b$). This compensating element 8 forms an arm which connects the lever 5 with the indicating needle 9 through a link 10 and a lever 11, which is connected to the shaft 12 supporting the needle. A spring 13, secured at one end to the frame 7 and at the other to shaft 12, serves to take up any play in the various connections of the multiplying mechanism just described. The dial 14, over which the indicator needle 9 moves, may be provided with suitable graduations, whereby the depth and therefore the quantity of liquid in the tank 19 is indicated. In the case of tanks of other than rectangular shape the graduations may be so located as to indicate either depth or quantity as desired.

On account of the fact that the volume of a given quantity of air under uniform pressure varies with its temperature, and on account of the fact that there is an inequality in the total linear expansion of the pressure chamber wall 2 and the diaphragm 3, the instrument described would not give correct indication of the depth of liquid in the tank under varying atmospheric temperatures, were it not for the action of the compensating element 8.

A rise in the temperature of the air in the tube 1 will tend to increase the volume which must result either in further expansion of the diaphragm, or cause the level of the liquid in the tube, indicated at 16, to descend. But since the level of the liquid in the tank will be very slightly raised by the expulsion of a portion of the slight amount of liquid in the tube, the difference of level between the liquid in the tube and that in the tank is increased only slightly. To the extent, however, that it is increased the pressure on the diaphragm 3 will be definitely increased, and, therefore, its center must rise slightly. The difference in the total amount of linear expansion between the plate or chamber wall 2 and the diaphragm 3 also tends to push the center of the diaphragm up slightly. The effects of a rise in temperature, just described, would tend to cause the indicator needle 9 to occupy a higher position than it previously occupied, notwithstanding the fact that the quality of liquid contained in the tank had not changed, but a rise in temperature simultaneously affects the brass and steel strips in the compensating element 8, and, since the linear expansion of the brass element will be greater than that of the steel element, element 8 as a whole will curve slightly in such direction as to tend to move the indicator needle 9 backward. The length of the element 8, and, therefore, the degree of motion of its free end connected to the link 10, is so proportioned that the effect of temperature upon the motions of the diaphragm of the instrument is compensated for and the indicator needle remains stationary for a given quantity of liquid in the tank, notwithstanding wide changes in temperature to which the device may be subjected in actual service.

A portion of the tube in the tank is preferably enlarged in order that a decrease in temperature of the confined air will result in less total decrease in the length of the confined air column under a given pressure than would be the case if the tube were of uniform diameter throughout. To illustrate, let it be supposed that the volume of the entire air-filled portion of the device, including the pressure chamber, the connecting portion of the tube, and the enlarged portion in the tank, is five cubic inches, and the volume of the enlargement alone is four cubic inches. A decrease in volume of the container air to the extent of one-tenth will permit approximately one-half a cubic inch of liquid to enter the tube, but the level of liquid in the tube will not be thereby raised to as great an extent as would be the case under like temperature drops if the tube were not enlarged at the end. The effect of temperature upon the relative liquid levels in the tank and in the tube, and consequently upon the variations in position of the diaphragm is therefore minimized by so enlarging the lower end of the tube as to make its capacity a large per cent. of the total capacity of the air confining elements of the device. Since in practice the device is likely to be subjected to an atmospheric temperature range of somewhat over 100° Fahrenheit and since the volume of air under constant pressure varies approximately one fifth for 100° change in temperature the capacity of the enlargement of the air confining conduit above the liquid level in it at the highest temperature should be at least approximately one fourth the combined capacity of the remainder of the conduit and the pressure receiving chamber of the instrument. Otherwise at the lowest temperature liquid would fill the enlargement and enter the small tube in which case there would be considerable change in level for small variations in temperature.

The openings 17 and 18 enter the tube at slightly different levels, and they are made relatively small to cause the liquid to pass into and out of the tube slowly and thus minimize the vibration of the indicating needle resulting from momentary changes in level of the liquid in the portion of the tank in which the tube is situated and which result from the swaying motions of a motor vehicle when running.

In the modified form of connection of the tube to the tank shown in Figs. 5 and 6 a three-way valve 15 is provided whereby the liquid from the tank can be shut off and the liquid in the tube drained off. In this way the cause of any faulty operation of a given device may frequently be quickly located without withdrawing the liquid from the tank or removing the tube therefrom.

I am aware that modifications in the form and location of the compensating element and in other features of the instrument herein described may be made without departing from the essence of the invention, and its scope is intended to be limited only as required by the appended claims.

Having fully described my invention, what I claim as new and desire to secure by Letters Patent of the United States is:

1. A device for indicating the depth of liquids in containers comprising a closed pressure receiving chamber, one wall only of the chamber being provided with a flexible portion and the remainder of the chamber being rigid, means for applying to the pressure receiving chamber a pressure varying with the depth of liquid, an indicator, and means whereby the indicator is controlled by the flexible portion of the wall of the pressure receiving chamber and including means to compensate for movements of the flexible portion of the pressure chamber resulting from the effects of changes in temperature.

2. A device for indicating the depth of liquids comprising a flexible member, means whereby said member is subjected to a pressure varying with the depth of the liquid, an indicator, means whereby the indicator is governed by the movements of said member, and an element responding to changes in its temperature to control the motion of the indicator to compensate for movements of the flexible member resulting from the effects of temperature changes.

3. A device for indicating the depth of liquids comprising a flexible member, means whereby said member is subjected to a pressure varying with the depth of the liquid, an indicator, means whereby the indicator is governed by the movements of said member, and an element composed of materials having different coefficients of expansion for controlling the movements of the indicator to compensate for movements of the flexible member resulting from temperature changes.

4. In an apparatus of the class described, the combination of a liquid containing tank, a gage having a pressure receiving chamber, and a conduit extending from said chamber to a point in the tank, said conduit being provided with an opening whereby liquid from the tank may enter it at a point below the level of the liquid in said tank, said conduit being also enlarged at its liquid receiving end, the capacity of said enlargement being greater than the combined capacity of the remainder of the conduit and pressure receiving chamber.

5. A device for indicating the depth of liquids, comprising an air confining conduit provided with a flexible portion and having an opening to receive liquid, whereby the pressure exerted by the liquid will be communicated by the confined air to the flexible portion of the conduit, an indicator, and means whereby the indicator is controlled by the flexible portion of the conduit and including means to compensate for movements of said flexible portion resulting from the effects of changes in temperature to which the device is subjected.

6. In apparatus of the class described, the combination of a liquid containing tank, means for indicating the depth of liquid in said tank, air confining means for transmitting pressure from the tank to the indicating means, said air confining means being provided with an enlarged portion situated below the level of liquid in the tank and communicating with the tank to receive liquid therefrom, the capacity of said enlargement above the liquid level therein under condition of highest liquid level in the tank and highest temperature to which the device is subjected being at least approximately one-fourth of the capacity of the remainder of the air confining means.

7. In apparatus of the class described, the combination of a liquid container, a pressure receiving chamber having a flexible portion, a gas confining conduit for transmitting from the container to the pressure receiving chamber a pressure varying with the depth of liquid in the container, said conduit being provided with an enlarged portion situated below the level of liquid in the container and communicating therewith to receive liquid therefrom, the capacity of said enlargement above the liquid level therein under condition of highest liquid level in the container and highest temperature to which the apparatus is subjected being at least approximately one-fourth of the combined capacity of the remainder of the gas confining conduit and the pressure receiving chamber, and indicating means actuated by the flexible portion of the pressure receiving chamber, said indicating means including means for compensating for the effect of variations in level of liquid in the enlargement due to changes in temperature to which the apparatus is subjected.

In testimony whereof, I have hereunto set my hand and affixed my seal.

EDWIN E. HUFFMAN. [L. S.]